(12) United States Patent
Morris

(10) Patent No.: US 12,111,196 B2
(45) Date of Patent: Oct. 8, 2024

(54) SYSTEMS AND METHODS FOR TRACKING FUEL DELIVERIES

(71) Applicant: GMS Industries, LLC, Birmingham, AL (US)

(72) Inventor: Larry Benjamin Morris, Birmingham, AL (US)

(73) Assignee: FUELFOX IP CO., LLC, Birmingham, AL (US)

( * ) Notice: Subject to any disclaimer, the term of this patent is extended or adjusted under 35 U.S.C. 154(b) by 155 days.

(21) Appl. No.: 17/981,110

(22) Filed: Nov. 4, 2022

(65) Prior Publication Data
US 2023/0408318 A1 Dec. 21, 2023

Related U.S. Application Data

(63) Continuation of application No. 17/747,328, filed on May 18, 2022, now Pat. No. 11,519,770.

(51) Int. Cl.
*G01F 15/063* (2022.01)
*B67D 7/04* (2010.01)
*G06Q 10/083* (2024.01)
*G06Q 50/06* (2024.01)

(52) U.S. Cl.
CPC ............ *G01F 15/063* (2013.01); *B67D 7/04* (2013.01); *G06Q 10/0838* (2013.01); *G06Q 50/06* (2013.01)

(58) Field of Classification Search
CPC .............. B67D 7/04; B67D 2007/0459; B67D 2007/0453
See application file for complete search history.

(56) References Cited

U.S. PATENT DOCUMENTS

| | | | | |
|---|---|---|---|---|
| 9,139,414 B2 ‡ | 9/2015 | Bergqvist | ................. | B67D 7/04 |
| 9,530,290 B2 * | 12/2016 | Hutchinson | ............ | B67D 7/342 |
| 9,969,604 B2 ‡ | 5/2018 | Koeninger | ............... | B67D 7/04 |
| 10,577,237 B2 * | 3/2020 | Fieglein | .................. | G07F 9/001 |

(Continued)

OTHER PUBLICATIONS

International Search Report and Written Opinion received for International Patent Application No. PCT/US2023/020121, mailed on May 31, 2023, 06 pages.

(Continued)

*Primary Examiner* — Timothy L Maust
(74) *Attorney, Agent, or Firm* — Maynard Nexsen PC; Brian T. Sattizahn

(57) ABSTRACT

A fuel truck is used to deliver fuel to vehicles parked at one or more locations. While the fuel truck is servicing vehicles, a user of the fuel truck uses a mobile device to assist in the management of fuel delivery. Specifically, each vehicle being serviced has a tag that is a capable of being read by the mobile device. The tag communicates information that identifies the vehicle, and the mobile device communicates with a meter on the fuel truck to track how much fuel is delivered to the identified vehicle. The mobile device also controls the meter such that fuel is allowed to flow only when the mobile device is aware of which vehicle is receiving the fuel. Thus, over time, the mobile device is able to track accurately which vehicle is receiving fuel so that the amount of fuel delivered to each vehicle can be precisely determined.

22 Claims, 4 Drawing Sheets

(56) References Cited

U.S. PATENT DOCUMENTS

| | | | | |
|---|---|---|---|---|
| 10,787,358 | B2 ‡ | 9/2020 | Dudley | B60P 3/228 |
| 10,902,422 | B2 * | 1/2021 | Fieglein | G06Q 20/401 |
| 11,339,048 | B2 ‡ | 5/2022 | McNamara | B67D 7/04 |
| 11,519,770 | B1 * | 12/2022 | Morris | B67D 7/04 |
| 2002/0020742 | A1 ‡ | 2/2002 | Streicher | B67D 7/346 |
| | | | | 235/381 |
| 2012/0182156 | A1 ‡ | 7/2012 | Portocalis | B67D 7/845 |
| | | | | 340/870.02 |
| 2013/0007650 | A1 ‡ | 1/2013 | Van Hoy | B64F 1/28 |
| | | | | 715/771 |
| 2013/0282500 | A1 ‡ | 10/2013 | Latorre | G06Q 20/14 |
| | | | | 705/16 |
| 2015/0106196 | A1 * | 4/2015 | Williams | G06Q 30/0253 |
| | | | | 705/14.51 |
| 2018/0339682 | A1 ‡ | 11/2018 | Hall | G06Q 20/145 |
| 2019/0162566 | A1 ‡ | 5/2019 | Pau | A61B 5/4875 |
| 2020/0369507 | A1 ‡ | 11/2020 | Cady | B67D 7/36 |
| 2020/0380632 | A1 ‡ | 12/2020 | Miller | G08G 1/202 |
| 2021/0245719 | A1 ‡ | 8/2021 | Hall | G05D 1/0297 |
| 2021/0325228 | A1 ‡ | 10/2021 | Strebe | G05D 7/0623 |
| 2021/0334927 | A1 ‡ | 10/2021 | Rojas Calderón | H04W 12/08 |
| 2022/0092906 | A1 ‡ | 3/2022 | Varini | B67D 7/145 |

OTHER PUBLICATIONS

Larry Benjamin Morris, U.S. Appl. No. 17/747,328 entitled, "Systems and Methods for Tracking Fuel Deliveries," filed May 18, 2022.

\* cited by examiner
‡ imported from a related application

SYSTEMS AND METHODS FOR TRACKING FUEL DELIVERIES

CROSS-REFERENCE TO RELATED APPLICATIONS

This application is a continuation of U.S. patent application Ser. No. 17/747,328, entitled "Systems and Methods for Tracking Fuel Deliveries" and filed on May 18, 2022, which is incorporated herein by reference.

RELATED ART

Fuel trucks are commonly used to deliver fuel to other vehicles so that they can be replenished with fuel without having to take the vehicles individually to gas stations. As an example, an organization, such as a rental car company, having a fleet of vehicles parked in a parking lot might use or hire the use of fuel trucks to deliver fuel to the vehicles while they are parked. Generally, using a fuel truck to deliver fuel to a large number of vehicles while they are parked is more efficient and less time consuming than attempting to refuel the vehicles at a gas station, even if the gas station is located nearby.

For business management and accounting purposes, it is generally desirable to log the amount of fuel that is delivered to each vehicle by a fuel truck. It is also desirable to track fuel delivery for efficiently managing a fleet of fuel trucks that may be used to deliver fuel to vehicles at one or more locations. However, tracking fuel delivery, particularly on a vehicle-by-vehicle basis, can be burdensome and error prone. In addition, equipping the fuel trucks with fuel gauges to assist in tracking the amount of fuel delivered and the amount of remaining in the fuel truck can be expensive. Further, even when a fuel truck is equipped with a fuel gauge, the readings from the fuel gauge are often inaccurate due to a variety of factors.

In this regard, the tanks holding fuel on conventional fuel trucks are often very large in order to service a large number of vehicles, and accurately measuring the amount of fuel remaining with significant precision for large tanks can be difficult. In addition, error can be increased when the fuel truck is positioned on an incline. Due at least in part to these reasons, many fuel trucks are not even equipped with gauges to read the amount of fuel remaining in the tanks that are used for delivering fuel to other vehicles.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

This disclosure generally pertains to systems and methods for tracking fuel delivery. In some embodiments of the present disclosure, a fuel truck is used to deliver fuel to a large number of vehicles parked at one or more locations, such as vehicles parked in a large parking lot at an organization managing a fleet of vehicles. While the fuel truck is servicing vehicles, a user of the fuel truck uses a mobile device to assist in the management of fuel delivery. In this regard, each vehicle being serviced has a tag that is a capable of being read by the mobile device. The tag communicates to the mobile device information that identifies at least the vehicle, and the mobile device communicates with a meter on the fuel truck to track how much fuel is delivered to the identified vehicle. The mobile device also controls the meter such that fuel is allowed to flow only when the mobile device is aware of which vehicle is receiving the fuel. Thus, over time, the mobile device is able to track accurately which vehicle is receiving fuel so that the amount of fuel delivered to each vehicle can be precisely determined.

In addition, the mobile device may assist in other management functions. As an example, the mobile device may track how much fuel remains in one or more tanks of the fuel truck. The mobile device may also be used to track information about the fuel truck's route. The information tracked by the mobile device may be uploaded to a server that can accumulate information from other fuel trucks to facilitate management of a fleet of fuel trucks.

Figure 1:
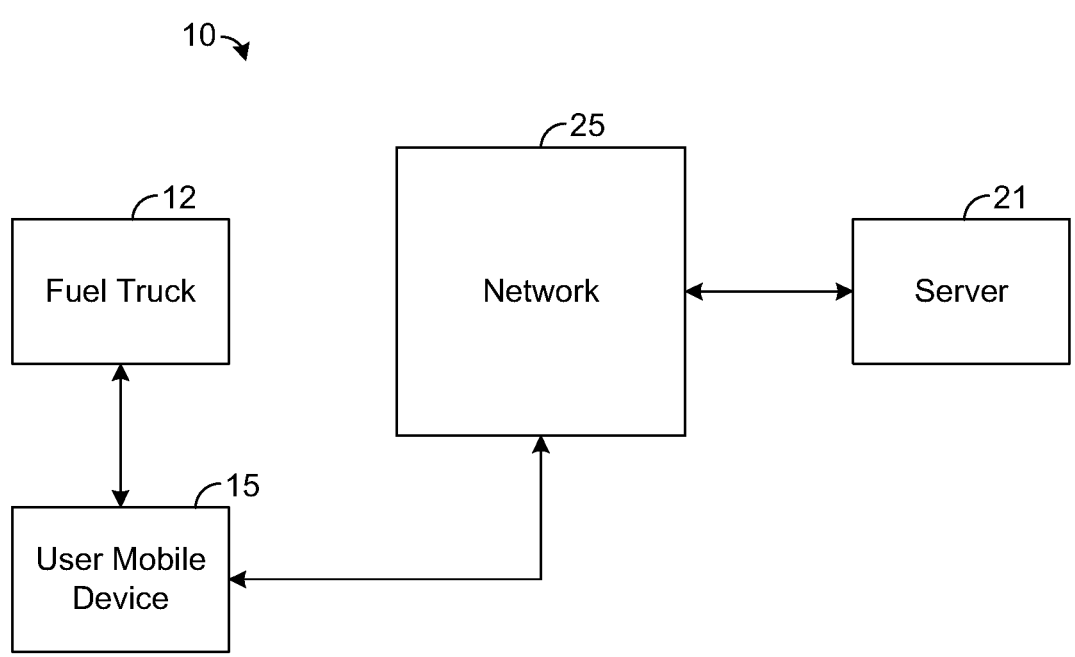
FIG. 1 is a block diagram illustrating an embodiment of a system for monitoring delivery of fuel to one or more vehicles using a fuel truck.

FIG. 1 depicts an exemplary embodiment of a system 10 for monitoring delivery of fuel to one or more vehicles using a fuel truck 12. As shown by FIG. 1, the system 10 comprises a user mobile device 15 that is configured to communicate with a fuel truck 12 in order to control and track fuel delivery to a plurality of vehicles (not shown in FIG. 1). As an example, the user mobile device 15 may track the amount of fuel delivered to each vehicle and the amount of fuel remaining in each tank of the fuel truck 12. In some embodiments, the user mobile device 15 is implemented as a cellular telephone (e.g., a smartphone) that is configured to communicate with the fuel truck 12 wirelessly. As an example, the mobile device 15 may be configured to communicate with the fuel truck wirelessly using Wi-Fi, but it is possible to use other communication techniques and protocols. As an example, it is possible for the user mobile device 15 to be connected to the fuel truck via one or more wired connections or for other wireless protocols to be used, such as Bluetooth. It is also possible for the user mobile device 15 to communicate with the fuel truck 12 using a cellular connection (e.g., making a cellular call to cellular equipment on the fuel truck 12).

The mobile device 15 is configured to communicate with a remote server 21 through a network 25, which may include any or a combination of known communication networks, such as a cellular network and the Internet. In one embodiment, the user mobile device 15 communicates with the network 25 using a cellular connection, but other types of communication are possible in other embodiments. The mobile device 15 may be configured to upload to the server information tracked by the mobile device 15, thereby facilitating access to the information by various users. As an example, similar information tracked for a fleet of fuel trucks 12 may be uploaded to the server 21 by any number of user mobile devices 15 to permit users to access such information at the server 21 for use in managing the fleet of fuel trucks 12.

In some embodiments, the mobile device communicates with one or more fuel meters (not shown in FIG. 1) on the fuel truck 12 to obtain refueling information as well as to control the refueling processes described herein. The mobile device 15 may be designed to utilize a conventional application programmatic interface (API) or other type of interface or protocol of a conventional fuel meter in such communications so that it is unnecessary to redesign the fuel meter to implement the functions and processes described herein. Thus, it is possible to use conventional fuel trucks with conventional fuel meters without having to retrofit the fuel trucks with new or redesigned fuel meters.

Figure 2:
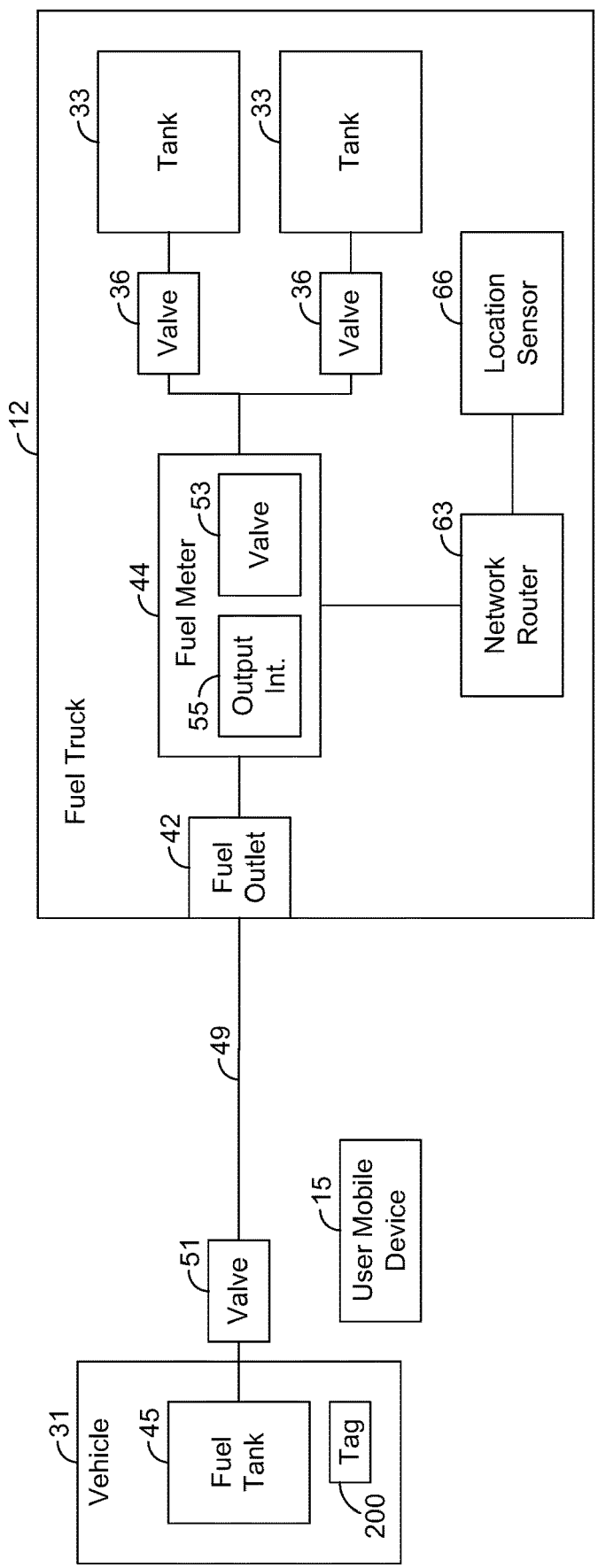
FIG. 2 is a block diagram illustrating an embodiment of a fuel truck, such as is depicted by FIG. 1, connected to a vehicle for delivering fuel to the vehicle.

FIG. 2 depicts an exemplary embodiment of a fuel truck 12 connected to a vehicle 31 for delivering fuel to the vehicle 31. In this regard, the fuel truck 12 has at least one fuel tank 33 for holding fuel to be delivered to vehicles 31. In the embodiment shown by FIG. 2, the fuel truck 12 has two such fuel tanks 33 for simplicity of illustration, but the fuel truck 12 may have any number of fuel tanks 33 in other embodiments.

As shown by FIG. 2, each fuel tank 33 is connected to a respective valve 36 for controlling whether fuel is permitted to flow from the tank 33. In some embodiments, each valve 36 can be manually actuated between an open state (for which fuel is permitted to flow through the valve 36) and a closed state (for which fuel is prevented from flowing through the valve 36) so that a user can manually control which fuel tank 33 is used for a given refueling operation. Each valve 36 is connected to a fuel outlet 42 through at least one fuel meter 44 that is configured to measure an amount of fuel that flows through the meter 44. The fuel outlet 42 can be connected to at least one fuel hose 49 that extends from the outlet 42 to a vehicle 31 having a fuel tank 45 to be replenished with fuel from the fuel truck 12. Note that the fuel hose 49 has at least one valve 51 that can be manually actuated between an open state and a closed state to control whether fuel is permitted to flow through the valve 51.

In this regard, in order to perform a refueling operation for the vehicle 31, a user connects an end of the hose 49 to the fuel tank 45 of the vehicle 31. The user also selects which tank 33 is to be used for the refueling operation. The user controls the valves 36 such that the valve 36 connected to the selected tank 33 is open, thereby permitting fuel to flow from such tank 33, and the valve 36 connected to the other tank 33 is closed, thereby preventing fuel from flowing from such tank 33. The user also opens the valve 51 so that fuel may flow. Thus, fuel should flow from one of the tanks 33 through the meter 44, outlet 42, and hose 49 to the fuel tank 45 (assuming that the meter 44 is in a state that permits to flow). If the user desires to cease the refueling operation, the user can close the valve 51, which would then stop the fuel from flowing from the hose 49 to the tank 45.

Note that the fuel meter 44 may have a valve 53 for controlling whether fuel is permitted to flow through the meter 44. The meter 44 may also have an output interface 55, such as a liquid crystal display (LCD), for displaying information in either a digital or non-digital format. In some embodiments, the meter 44 is configured to measure the amount of fuel in gallons or some other measurement unit that flows through the meter 44 and to display the measured amount via the output interface 55. As an example, the displayed amount may indicate the total amount of fuel that has flowed through the meter 44. From time-to-time, the total may be manually reset to 0 so that the meter 44 begins measuring total flow since reset. The meter 44 may also be configured to provide other information, such as ambient temperature, fuel evaporation rate based on measured atmospheric conditions, instantaneous flow rate for the fuel flowing through the meter, and/or other information as may be desired.

In some embodiments, the meter 44 also has a communication interface (not shown in FIG. 2 for simplicity of illustration) for enabling the meter 44 to communicate with other components of the fuel truck 12 or system 10. In some embodiments, the meter's communication interface comprises a wireless radio, such as a Wi-Fi radio, that is able to communicate with other components wirelessly, but it is also possible for the communication interface to be connected to other components by wires for communicating over the wires.

In the embodiment depicted by FIG. 2, the fuel truck 12 has a network router 63 that wirelessly communicates with various components of the system 10 and routes messages between the components, thereby forming a network, such as a local area network. As an example, the router 63 may be a Wi-Fi router that forms a Wi-Fi network for communication. Specifically, the user mobile device 15 may be configured to communicate with the meter 44 through the network router 63 using Wi-Fi or some other wireless protocol. In other embodiments, the mobile device 15 may be configured to communicate with the meter 44 directly or using other communication techniques or protocols.

The truck 12 also comprises a location sensor 66, such as a global positioning system (GPS) sensor or other type of location sensor that is configured to sense a location of the truck 12. The mobile device 15 may be configured to communicate with the location sensor 66 through the network router 63 or otherwise to determine the location of the truck 12, as will be described in more detail below.

Figure 3:
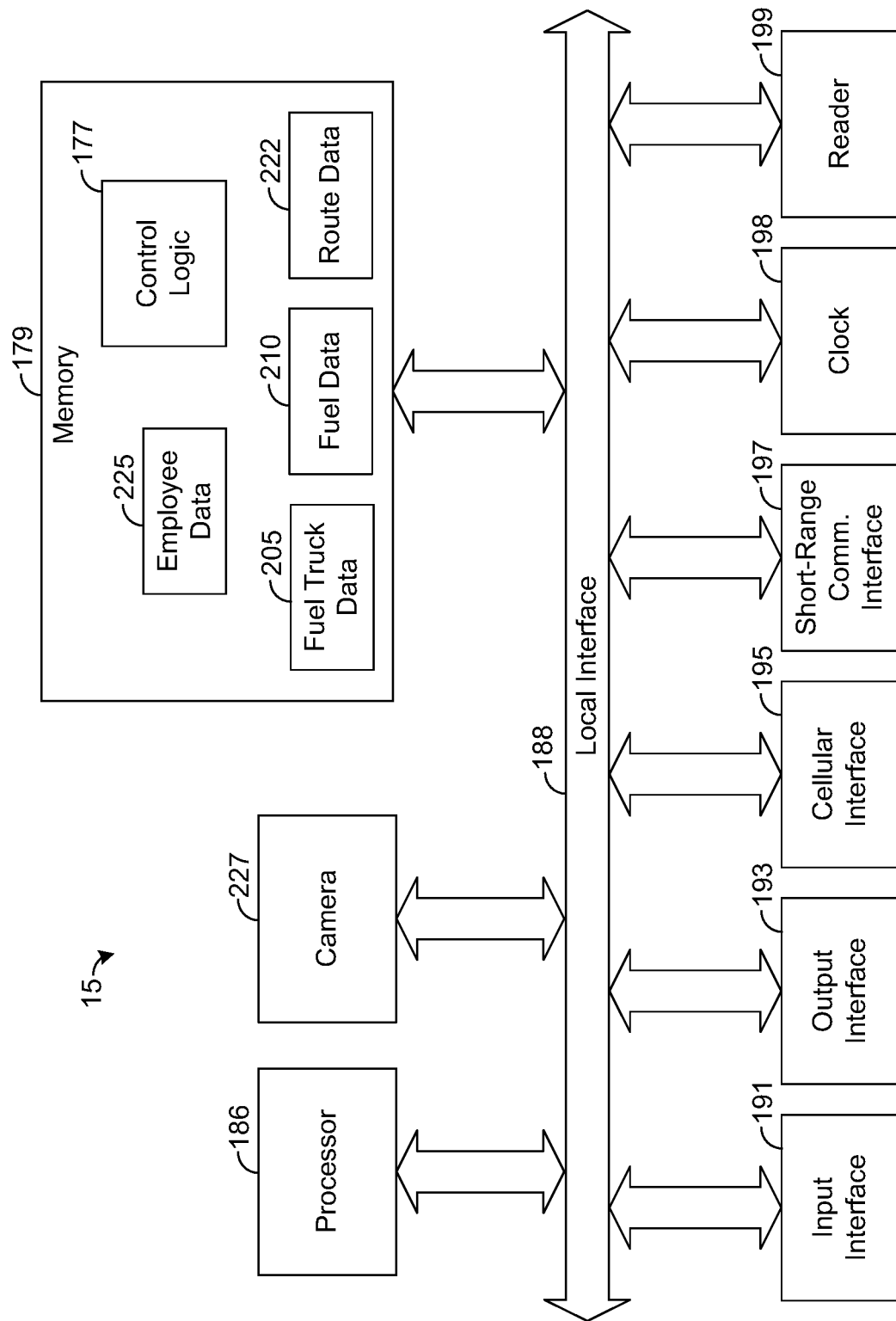
FIG. 3 is a block diagram illustrating an embodiment of a user mobile device, such as is depicted by FIG. 1, that may be used to monitor and control a refueling operation involving the fuel truck.

FIG. 3 depicts an exemplary embodiment of the user mobile device 15. As shown by FIG. 3, the mobile device 15 comprises control logic 177 for generally controlling the operation of the mobile device 15, as will be described in more detail hereafter. The control logic 177 can be implemented in software, hardware, firmware or any combination thereof. In the exemplary mobile device 15 illustrated by FIG. 3, the control logic 177 is implemented in software and stored in memory 179 of the device 15.

Note that the control logic 177, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary user mobile device 15 depicted by FIG. 3 comprises at least one conventional processor 186, such as a digital signal processor (DSP) or a central processing unit (CPU), that communicates to and drives the other elements within the device 15 via a local interface 188, which can include at least one bus. Furthermore, an input interface 191, for example, a keyboard or a mouse, can be used to input data from a user of the device 15, and an output interface 193, for example, a printer, monitor, liquid crystal display (LCD), or other display apparatus, can be used to output data to the user. In some embodiments, the input interface 191 and the output interface 193 can be integrated or share hardware resources. As an example, the input interface 191 and the output interface 193 may be implemented with a touchscreen that is configured to display information and receive inputs by capacitive sensing on the display screen.

The user mobile device 12 may be implemented with a laptop or other type of mobile computer. In some embodiments, the mobile device 12 is implemented with a handheld device, such as a smartphone. As shown by FIG. 3, the device 12 may have a cellular interface 195 that comprises a cellular transceiver for wirelessly communicating with a cellular network. The device 12 may also have a short-range communication interface 197 configured to communicate with components of the truck 12 such as the meter 44. As an example, the communication interface 197 may have a Wi-Fi radio that enables the device 12 to communicate with the meter 44 and/or the location sensor 66 through the network router 63. However, other types of communication devices and protocols are possible. As an example, it is possible for the communication interface 197 to communicate with the meter 44 directly using Bluetooth or some other protocol.

As shown by FIG. 3, the mobile device 15 also has a clock 198 for tracking time and a reader 199 that is configured to wirelessly communicate with a tag 200 (FIG. 2) that is positioned on the vehicle 31 to be refueled. In some embodiments, the reader 199 and tag 200 are configured to communicate using radio frequency identification (RFID), such as near field communication (NFC) or other form of RFID, although other communication techniques are possible.

In NFC, when the reader 199 is moved close to the tag 200 (e.g., a few inches or less) such that the reader 199 and the tag 200 are within range of each other, the tag 200 is inductively coupled to the reader 200 such that the tag 200 is capable of modulating a wireless carrier signal transmitted by the reader 200. The reader is configured to sense the modulation of the carrier signal so that the reader 200 can read the data used to modulate the carrier signal by the tag 200. Thus, the tag 200 is able to effectively communicate data to the reader 199. In some embodiments, the tag 200 may be passive such that the components of the tag 200 are powered by the carrier signal emitted by the reader 199, but it is also possible for the tag 200 to be actively powered by a battery or otherwise.

In embodiments for which the reader 199 and tag 200 are configured to communicate using at least some other forms of RFID, the communication may be similar to that described above for NFC except it is unnecessary for the reader 199 and tag 200 to be inductively coupled. As an example, the reader 199 may be configured to transmit a wireless interrogation signal to which the tag 200 may respond by transmitting data to the reader 199. The range for such RFID communication may be greater than the few inches typically used for NFC. In other embodiments, yet other communication techniques (e.g., optical communication or Bluetooth) may be employed to communicate between the tag 200 and reader 199.

However, it is generally desirable for the range between the reader 199 and tag 200 to be limited, such as a few inches or feet, so that successful communication indicates that the user is at the identified vehicle 31 and likely intends to refuel the vehicle 31 in the current refueling operation for which the tag 200 is being read. Specifically, at the time of reading, the reader 199 and tag 200 are close enough such that the vehicle 31 having the tag 200 is likely being refueled in the current refueling operation (assuming that the mobile device 15 is in close proximity with, e.g., carried by, the user operating the truck 12 for refueling operations). In fact, using NFC or other forms of RFID with relatively short ranges helps to ensure that the reader 199 and tag 200 are able to communicate only when the user intentionally places the reader 199 close to the tag 200 in order to read the identifier of the vehicle 31 from the tag 200 during a refueling process for the vehicle 31, as will be described in more detail below.

As shown by FIG. 3, the memory 179 may be configured to store fuel truck data 205 indicating various information about the fuel truck 12 such as the amount of fuel that is currently in each tank 33 of the fuel truck 12. Initially, this information may be input by a user. As an example, before commencing a series of refueling operations, the tanks 33 may be filled with fuel to be used in the refueling operations. If the tanks 33 are completely filled, then determining the amount of fuel in each tank 33 may be relatively simple. In this regard, when a given tank 33 is completely full, the amount of fuel in the tank 33 should be the tank's total fuel capacity, which may be known (e.g., specified by the manufacturer of the tank 33 or truck 12). However, if the tank 33 is not completely full, then the amount of the fuel in the tank 33 may be measured or estimated. For example, a dip stick may be used to measure the amount of fuel in tank 33, or if the tank 33 is equipped with a fuel gauge, the fuel gauge may be read by a user. Regardless of the techniques used to estimate or otherwise determine the amount of fuel in a tank 33, this information may be input to the mobile device using the input interface 191 or otherwise, and such information may be stored in the fuel track data 205, which may be used by the control logic 177 as will be described in more detail hereafter.

The memory 179 may also comprise fuel data 210, which indicates how much fuel is dispensed to a given vehicle 31 in a refueling operation for the vehicle 31. As an example, when a refueling operation is performed on a vehicle 31, the control logic 177 may be configured to associate an identifier of the vehicle 31 with a data value indicating an amount of fuel dispensed into the vehicle's tank 45 during the refueling operation, and the control logic 177 may further store the associated values as part of the vehicle data 210. Thus, over time, the control logic 177 may use the data 210 to track how much fuel is dispensed to vehicles 31 for many refueling operations to provide an accounting or a log of the refueling operations.

As an example, the fuel data 210 may be stored in a database in which the vehicle identifier (ID) of a vehicle 31 is correlated with information for each refueling operation performed on the vehicle 31. Such information may include the date and/or time of the refueling operation as well as the amount of fuel dispensed to the vehicle 31 during the refueling operation. For example, an entry for the refueling operation may be generated in a database or other type of memory, and the vehicle's identifier, time of refueling, and amount of fuel dispensed may be stored in the entry thereby associating the vehicle identifier and the amount of fuel dispensed with the same refueling operation. The information stored in the entry and/or otherwise associated with the refueling operation may also include other parameters, such as the price of the fuel being dispensed or environmental conditions at the time of the refueling operation (e.g., temperature, evaporation rate, etc.) as determined by the fuel meter 44 or otherwise. Such information may be logged for any number of vehicles 31 and for any number of refueling operations. That is, the vehicle data 210 may be updated over time to define a log of refueling operations that can be analyzed for managing the vehicles 31 or the refueling services or for other purposes. As an example, the vehicle data 210 may be analyzed to determine how much fuel is dispensed to any vehicle 31 over any desired time frame.

To perform a refueling operation for at least one vehicle 31, the fuel truck 12 is driven to a location or otherwise positioned close enough to the vehicle 31 such that the fuel hose 49 may reach the vehicle 31, as shown by FIG. 2. Initially, the fuel meter 44 of the truck 12 may be disabled from allowing fuel to flow. In this regard, the meter 44 may be in a state such that the meter's valve 53 is closed thereby preventing fuel from flowing through the valve 53.

When a user desires to commence the refueling operation, the user may position the mobile device 15 close enough to the tag 200 so that the reader 199 (FIG. 3) of the mobile device 15 communicates with (e.g., reads) the tag 200. As noted above, such communication may occur via NFC when the reader 199 is positioned within a few inches or less of the tag 200, but other types of RFID or non-RFID communication may be used in other embodiments. In some embodiments, the tag 200 is located close to an inlet of the fuel tank 45 of the vehicle 31 such that it is readily available to a user accessing the inlet for refueling, but other locations of the tag 45 on the vehicle 31 are possible in other embodiments.

Figure 4:
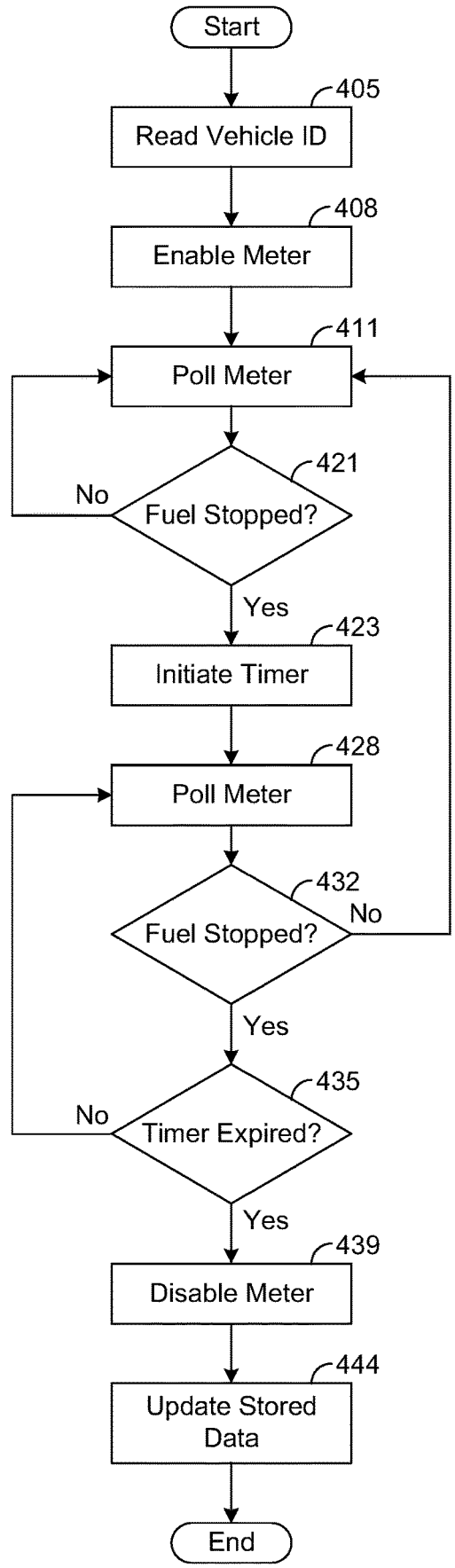
FIG. 4 is a flowchart illustrating an exemplary process for refueling a vehicle.

In some embodiments, the tag 200 transmits to the reader 199 of the mobile device 15 a vehicle identifier (ID) that identifies the vehicle 31 on which the tag 200 resides, as shown by block 405 of FIG. 4. When NFC is used, such communication may occur via load modulation of a carrier signal transmitted by the reader 199, but other techniques for communicating between the tag 200 and reader 199 are possible. Note that by using NFC or other communication technique with a short communication range, it can be assumed that the user of the mobile device 15 is at the vehicle 31 and intends to refuel the vehicle 31 in the current refueling operation. Based on such assumption, the control logic 177 of the mobile device 15 is configured to associate the received vehicle ID with the current refueling operation for tracking purposes, as will be described in more detail below.

In response to the received vehicle ID, the control logic 177 of the mobile device 15 is configured to transmit a message to the fuel meter 44 on the fuel truck 12 for enabling the meter 44 (e.g., controlling a state of the meter 44 such that fuel is permitted to flow through the meter's valve 53), as shown by block 408 of FIG. 4. As an example, the message may be communicated via Wi-Fi or other communication protocol through the router 63 to the meter 44. In response, the meter 44 is configured to open the valve 53 so that fuel may flow through the valve 53. Unless otherwise indicated, it will be assumed for simplicity of description that any message communicated between the mobile device 15 and the meter 44 occurs via Wi-Fi and is routed by the network router 63. However, as noted previously, other communication techniques and protocols may be used in other embodiments.

To perform the refueling operation on the vehicle 31, the user connects the hose 51 to an inlet of the fuel tank 45. The user also appropriately controls the valves 36 of the truck 12 such that the valve 36 connected to the tank 33 to be used for the refueling operation is open, and the valve 36 connected to the other tank 33 is closed. Thus, when the user desires to dispense fuel into the tank 45, the user can open the hose valve 51 thereby permitting fuel to flow into the tank 45. When the user desires to stop dispensing fuel, the user may close the valve 51 so that fuel is no longer permitted to flow through it, thereby stopping fuel flow.

In some embodiments, the control logic 177 of the mobile device 15 is configured to allow the meter 44 to remain enabled for fuel flow only a short time after fuel stops flowing through the meter 44 (such as when the user at least temporarily closes the hose valve 51). As an example, once the meter 44 is enabled for fuel flow, if fuel does not flow through the meter 44 for 5 continuous seconds (or some other finite time period), referred to hereafter as the "Stoppage Period," the control logic 177 is configured to disable the meter 44 for fuel flow and require a new scan of a vehicle ID before enabling the meter 44 again. The duration of the Stoppage Period is preferably selected to be short enough such that a user is unlikely to be able to move, within the short duration of the Stoppage Period, the hose 49 from the vehicle 31 identified by the scan in block 405 to another vehicle 31 for refueling the other vehicle. Thus, disabling the meter 44 when fuel does not flow through the meter 44 for a certain period of time (e.g., for at least the Stoppage Period) facilitates tracking of refueling operations by preventing the user from initiating a new refueling operation with a new vehicle 31 without reading the vehicle ID of the new vehicle 31, as will become more apparent in the below description. This may help prevent a situation where a user has moved the hose 49 to a new vehicle 31 without the control logic's knowledge.

In any event, once the meter 44 has been enabled, the control logic 177 of the mobile device 15 is configured to communicate with the meter 44 to determine whether fuel is flowing so that the control logic 177 can determine whether fuel has stopped flowing for at least the Stoppage Period. In some embodiments, this is achieved by the control logic 177 repeatedly polling the meter 44 while the meter 44 is enabled, as shown by block 411 of FIG. 4. Specifically, the control logic 177 transmits a message requesting a reading of fuel flow from the meter 44. In response, the meter 44 is configured to return the total amount of fuel that has been measured passing through the meter 44 since it was last reset. Thus, by comparing the current reading to one or more previous readings, the control logic 177 can determine whether fuel is currently flowing through the meter 44 or whether fuel flow has stopped (i.e., fuel is not flowing). In some embodiments, the control logic 177 polls the meter 44 at a high rate, such as about every 500 milliseconds (ms) or some other short time period, so that a stoppage of fuel flow or a resumption of fuel flow can be quickly detected. However, it is possible for other (e.g., slower) polling rates to be used in other embodiments.

Note that using a polling operation, as described above, is advantageous for enabling the control logic 177 to communicate with conventional meters 44 for the purpose of determining the state of fuel flow without requiring a redesign of conventional meters 44. In this regard, many conventional meters 44 are already configured to provide the total amount of fuel flow through the meter 44 since reset in response to a message requesting such data. Such information has typically been used to ascertain the total amount of fuel dispensed (e.g., used to refuel a particular vehicle 31 or a group of vehicles). As an example, by resetting the meter 44 before commencing a refueling operation and then reading the meter 44 after completion of the refueling operation, it is possible to ascertain how much fuel was dispensed during the refueling operation. However, in the context of the instant embodiment being descried, the control logic 177 may use the readings not just to determine the total amount of fuel that has been dispensed since reset, but also to ascertain when fuel is flowing, as described above.

In other embodiments, it is possible to use other techniques to inform the control logic 177 when fuel flow is stopped. As an example, it is possible to design the meter 44 to send a notification when it detects a stoppage of fuel flow. However, such techniques may require at least some conventional meters 44 to be redesigned in order to provide this functionality. Yet other techniques for determining whether fuel is flowing and/or when fuel flow is stopped are possible.

In any event, when the control logic 177 determines that fuel is not flowing through the meter 44, the control logic 177 may be configured to initiate a timer, as shown by blocks 421 and 423 of FIG. 4, for tracking how long the stoppage in fueling continues. In this regard, based on the clock 198 or otherwise, the control logic 177 begins tracking time to determine whether the stoppage continues for at least the Stoppage Period (e.g., five seconds or some other predefined period). For example, the control logic 177 may initiate the timer such that it expires after an amount of time equal to the Stoppage Period elapses. After initiating the timer, the control logic 177 continues to poll (e.g., every 500 ms or some other rate) the meter 44, as shown by blocks 428 and 432 of FIG. 4, for determining whether fuel flow through the meter 44 resumes. If fuel flow begins or resumes prior to expiration of the timer, then the control logic 177 returns to block 411 and continues to monitor the fuel flow for another stoppage in the future.

If the timer is determined to expire in block 435 of FIG. 4, indicating that the fuel has not flown through the meter 44 for at least the Stoppage Period, then the control logic 177 is configured to terminate the current refueling operation. In this regard, the control logic 177 disables the meter 44 for fuel flow, as shown by block 439 of FIG. 4. As an example, the control logic 177 may transmit a message to the fuel meter 44 for disabling fuel flow at the meter 44. In response, the meter 44 is configured to close the valve 53 so that fuel may not flow through the valve 53.

Note that many conventional meters 44 are designed to control the valve 53, thereby controlling fuel flow through the meter 44, in response to messages or commands from external devices. For example, a meter 44 may be configured to pause fuel flow in response to a particular command from an external device and to resume fuel flow in response to another command from an external device. Thus, it is possible for the control logic 177 to enable and disable conventional meters 44 for fuel flow in the manner described above without requiring a redesign of the conventional meters 44. In fact, the techniques described herein for controlling and monitoring fuel flow may be used with a conventional fuel truck 12 without requiring the truck 12 to be retrofitted with new equipment or otherwise reconfigured.

As shown by block 444, the control logic 177 is also configured to update the fuel truck data 205 and the fuel data 210 stored in memory 179. With respect to the fuel data 210, the control logic 177 is configured to update the fuel data 210 to store a value indicative of the amount of fuel dispensed to the vehicle 31 in the current refueling operation (i.e., since the scan or other read of the vehicle's ID in block 405) and to correlate this value with the vehicle ID of the vehicle 31.

As an example, the fuel data 210 may be stored in a database, and a new entry of the database may be created upon the read of the vehicle ID in block 405. Various information about the current refueling operation may be stored in the entry, such as the vehicle ID, the value indicating the amount of fuel dispensed to the vehicle 31, the time and date of the refueling operation, and the approximate location of the refueling operation. Note that the approximate location may be indicated by the location sensor 66 of the truck 12. Alternatively, the location information may be provided by a location sensor (not specifically shown), such as a GPS sensor, of the user mobile device 15. Other techniques for determining the location information are possible, such as manual entry of such information to the mobile device 15 by a user. In addition, it is unnecessary for the fuel data 210 to be stored in a database, and other techniques for indicating information about the refueling operations are possible.

Note that there are various techniques that may be used to determine the amount of fuel dispensed to the vehicle 31. As an example, if the fuel meter 44 is configured to maintain a running sum of the total amount of fuel dispensed since reset, then the control logic 177 may use such value to determine the total amount of fuel dispensed to the vehicle 31 during the refueling operation. As an example, as described above, once the fuel meter 44 is enabled, the control logic 177 may be configured to repetitively poll the meter 44 for the running sum value. In such case, the total amount dispensed to the vehicle 31 in the refueling operation may be calculated by subtracting the first running sum value returned by the meter 44 after block 408 from the last running sum value returned by the meter 44. In other embodiments, other techniques may be used to determine the total amount of fuel dispensed.

In some embodiments, the fuel data 210 defines a ledger or history of refueling operations indicating at least (1) which vehicle 31 receives fuel during each refueling operation and (2) the amount of fuel dispensed to the vehicle 31 in the refueling operation. Thus, if desired, the fuel data 210 may be analyzed to determine the amount of fuel dispensed to any given vehicle 31 during any given time frame.

As noted above, the control logic 44 is also configured to update the fuel truck data 205 in block 444. Specifically, the control logic 44 may be configured to update the fuel truck data 205 to indicate the amount of fuel dispensed from a tank 33 during the refueling operation. In this regard, in some embodiments, the control logic 44 is configured to maintain for each tank 33 a value, referred to hereafter as "fill level," indicating the total amount of fuel in the tank 33. As indicated above, such value may be initialized prior to the performance of refueling operations. As an example, the amount of fuel in each tank 33 may be measured or otherwise estimated and then input to the mobile device 15.

In addition, during a refueling operation, the control logic 177 is preferably aware of which tank 33 is being used for the refueling operation. As an example, using the output interface 193 (FIG. 3) or otherwise, the control logic 177 may prompt the user to provide an input indicating which tank 33 is being used for the refueling operation. In response, the user may provide an input via the input interface 191 (FIG. 3) or otherwise indicating which tank 33 is being used for providing fuel based on the states of the valves 36. In other embodiments, one or more sensors (not) shown may be configured to sense the states of the valves 36 and report such states to the user mobile device 15, and based on such states, the control logic 177 may determine which of the tanks 33 is being used for the refueling operation. In this regard, the tank 33 connected to the valve 36 that is in the open state is being so used.

In block 444, the control logic 177 is configured to update the fuel truck data 205 to reduce the fill level of the tank 33 being used by the amount of the fuel determined to have been dispensed to the vehicle 31 in the refueling operation. As noted above, the amount of fuel dispensed to the vehicle 31 may be determined based on the information from the fuel meter 44. Thus, the fill level for each tank 33 should accurately indicate the total amount of fuel remaining in the tank 33. At any time, the user of the mobile device 15 may view the fill levels of the tanks 33 and make decisions as may be desired, such as controlling the states of the valves 36 to control which tanks 33 are used in refueling operations.

Note that once the process shown by FIG. 4 is terminated, another refueling operation may be commenced using the same techniques described above. For example, if a user has temporarily stopped refueling a first vehicle such that the process shown by FIG. 4 terminates prior to completely filling the tank 45 of the first vehicle, then the user may initiate a second refueling operation by reading the vehicle's tag 200 again, and then continue filling the vehicle's tank 45 in the second refueling operation. The second refueling operation will be similarly tracked in the fuel data 210 so that the data 210 reflects the amount of fuel dispensed to the first vehicle in both refueling operations.

In other examples, once a refueling operation is terminated, the user may take the fuel hose 49 to a different vehicle and perform a refueling operation on the other vehicle. To initiate such refueling operation, the user positions the mobile device 15 to read the tag 200 of the new vehicle 31 so that the data for the refueling operation will be correlated with the vehicle ID of the new vehicle 31. This process may be repeated vehicle-by-vehicle so that the fuel data 210 indicates a history of refueling operations for a plurality of vehicles 31.

In some embodiments, the history indicated by the fuel data 210 may be used to determine how much the tanks 33 should be filled with fuel before commencing a set of refueling operations during a certain time period, such as a day. In this regard, as noted above, each vehicle 31 may correlated with a location. In some embodiments, the locations correspond to certain stops along one or more fuel delivery routes. As an example, it is possible for a fleet of fuel trucks to be used to service a number of stops where each stop corresponds to a location of an organization having vehicles in need of refueling. As an example, a given stop may be a parking lot for vehicles of a car rental agency where the fuel truck 12 is to be used to refuel vehicles of the car rental agency in the parking lot. Another stop may be another parking lot of the same car rental agency or a parking lot of a different car rental agency or a different type of organization having vehicles in need of refueling.

For illustrative purposes assume that a given fuel truck 12 is to be used to travel a route to one or more stops to deliver fuel. Such route, including identification of stops are along the route, may be indicated by route data 222 stored in the mobile device 15, as shown by FIG. 3. The route data 222 may be predefined (e.g., downloaded from a remote server 21 or other location or input by a user of the device 15 prior to commencing a set of refueling operations). As an example, the fuel truck 12 may be filled with fuel, driven to a plurality of stops over the course of a day (or other time period), deliver fuel at each of the stops, and then return to be refilled with fuel.

In some embodiments, the control 177 is configured to analyze the route data 222 to determine the stops along a route to be driven by the truck 12 and to then analyze the fuel data 210 based on the identified stops in order to provide a value indicating an estimated amount of fuel that is required or desired for the route. In this regard, based on the history of the refueling operations, the control logic 177 attempts to predict the total amount of fuel that is required or desirable for the refueling operations (within a desirable margin of error) and provide (e.g., display) a value indicative of such total. In some cases, the control logic 177 errs on the side of estimating a higher amount in order to reduce the likelihood that the tanks 33 will run out of fuel before the route is completed. If desired, a user may fill the tanks 33 in accordance with the prediction such that the total amount of fuel 33 contained in the tanks 33 at the start of the route is less than the total capacity of the tanks 33 but likely enough to service the vehicles 31 to be refueled along the route.

There are various techniques that may be used to predict the amount of fuel to be used on the route. In some embodiments, the control logic 177 is configured to analyze the fuel data 210 and determine, for each stop, the maximum amount of fuel previously dispensed at the same stop over a time period, such as many months (e.g., a year or longer).

As an example, assume that the fuel truck 12 makes a daily stop to a car rental agency over the course of a year. In such example, the control logic 177 may be configured to analyze the fuel data 210 to determine on which day was the most fuel dispensed to vehicles 31 at the stop. The control logic 177 may then use the total amount of fuel dispensed to all of the vehicles at the stop on the identified day (as indicated by the fuel data 210) as the amount of fuel needed for the stop for the current route to be driven by the truck 12. The control logic 177 may be configured to do the same for each stop along the route and to then sum the values for each stop to predict the total amount of fuel needed for the current route.

By using the maximum amount of fuel dispensed at each stop within the last year (or other time period) in order to predict the total amount of fuel needed for the current route, it is likely that the prediction of the total amount of fuel needed will slightly exceed the total amount of fuel actually needed for the current route, thereby likely preventing the fuel truck 12 from running out of fuel on the current route. However, the predicted amount may nevertheless be less than the total capacity of the tanks 33. Thus, by filling the tanks 33 with the predicted amount rather than completely filling the tanks 33, the fuel truck 12 will carry less than the total capacity of the tanks 33 yet enough fuel to likely ensure that the tanks 33 will not run out of fuel before the route is complete. In other embodiments, other techniques may be used to predict the amount of fuel the tanks 33 should carry along a route.

Note that completely filling the tanks 33 with fuel prior to commencing a route helps to ensure that there is more fuel in the tanks 33 for servicing vehicles 31 along the truck's route. However, fuel prices tend to fluctuate quickly, such as daily. To the extent that there is fuel remaining in the tanks 33 upon completion of the route, it is possible that the fuel prices may change before the remaining fuel is later delivered, such as when a new route is commenced particularly if the new route is commenced the next day or later. Reducing the amount of fuel that remains in the tanks 33 upon completion of a route generally helps to mitigate for the risk associated with fuel price fluctuations. Thus, using the history indicated by the fuel data 210 to better predict the amount of fuel needed so that the amount of fuel remaining in the tanks 33 upon completion of a route is minimized or otherwise reduced helps to mitigate the risks associated with fuel price fluctuations.

It should be further noted that there are various techniques and algorithms that may be used to predict the total amount of fuel needed for a route. As an example, rather than using the maximum amount of fuel dispensed to a given stop during a certain time period, the control logic 177 may instead use the average amount of fuel dispensed at a given stop over a certain time period (such as a year). However, using an average value rather than a maximum value may increase the chances that the predicated amount of fuel needed may be less than the actual amount of fuel needed.

As noted above, if the tanks 33 run out of fuel before completing a route, then additional costs may be incurred, such as having to refill the tanks 33, before the route can be resumed.

There are times when communication between the user mobile device 15 and the network router 63 and thus the meter 44 may be interrupted due to any of various reasons. As an example, RF interference or other technical difficulties may prevent the mobile device 15 from communicating at least temporarily with components on the truck 12, such as the fuel meter 44. If the mobile device 15 is unable to communicate with the meter 44, then the mobile device 15 may be unable to control the meter 44, such as pausing or otherwise stopping the flow of fuel through the meter 44.

In some embodiments, when communication with the network router 63 is interrupted or otherwise lost, the control logic 177 is configured to enter into an operational mode, referred to herein as "offline mode," until such communication is re-established. In the offline mode, the control logic 177 is configured to prompt the user for information that enables the control logic 177 to continue tracking the refueling operations so that the refueling operations can continue despite the loss of communication. In this regard, once the user positions the mobile device 15 to read the tag 200 of a vehicle 31, thereby indicating that a new refueling operation is being commenced, the control logic 177 is configured to prompt the user for the current reading of the meter 44 (e.g., the total amount of fuel that has passed through the meter 44 since reset). In response, the user may walk to the meter 44 and read such value from the display of the meter 44 and then input the read value via the input interface 191 of the mobile device.

When the user positions the mobile device 15 to read the tag 200 of a new vehicle 31 (i.e., different than one refueled in the last refueling operation), thereby indicating that a refueling operation of the new vehicle 31 is being commenced, the control logic 177 may again prompt the user for the current reading of the meter 44. By subtracting the value read from the meter 44 for the previous refueling operation from the value now read from the meter 44 for the current refueling operation being performed on the new vehicle, the total amount of fuel dispensed in the previous refueling operation may be determined. The control logic 177 may update the fuel data 210 appropriately to indicate this value for the previous refueling operation thereby tracking the refueling operations while in the offline mode.

It should be noted that it is unnecessary to use the same fuel truck 12 or the same mobile device 15 to generate all of the fuel data 210. In this regard, upon completing a route or at other times, the fuel data 210 generated by the control logic 177 may be uploaded to the server 21 which stores the fuel data 210. Further, the server 21 may receive and store the fuel data 210 from any number of mobile devices 15 in order to maintain a complete history of the refueling operations performed by multiple trucks 12, such as a fleet of trucks owned by an operator of a refueling service. Further, prior to commencing a route, the mobile device 15 of the user assigned to the route may download, from the server 21, the fuel data 210 of the vehicles 31 associated with the stops of the route so that the history of the refueling operations at the stops can be analyzed for use in predicting the amount of fuel needed or desired for the route, as described above.

In some embodiments, the tag 200 is programmed with information that indicates not just the vehicle ID of the vehicle 31 on which the tag 200 resides but also other information associated with the vehicle 31, and such information is communicated to the reader 199 during a read of the tag 200. As an example, the tag 200 may communicate information indicating a type of fuel (e.g., a fuel type requirement) that is to be dispensed to the vehicle 31, such as whether the vehicle 31 uses gas or diesel fuel and/or a minimum octane level of the fuel to be dispensed to the vehicle 31. The control logic 177 is configured to compare this information to information indicating the type of fuel to be dispensed to the vehicle 31 by the fuel truck 12 to confirm that the appropriate type of fuel will be dispensed.

As an example, the fuel truck data 205 may indicate the type of fuel that is contained in each tank 33 of the truck 12. The control logic 177 may access this information to determine the type of fuel in the tank 33 that is currently selected for fuel delivery in the current refueling operation and determine whether the fuel type matches the type of fuel required by the vehicle 31, as indicated by the information from the tag 200. If the fuel type matches the fuel type requirement, then the control logic 177 permits the refueling operation to occur, as described above. However, if the fuel type does not match the fuel type requirement (indicating that the selected tank 33 has an incorrect type of fuel for the vehicle 33), then the control logic 177 takes steps to prevent the flow of fuel from the tank 33 to the vehicle 31. As an example, the control logic 177 may disable the flow meter 44 such that fuel is not permitted to flow through the meter 44. The control logic 177 may also display a warning via the output interface 193 indicating the discrepancy between the fuel type and the fuel type requirement. Further, the control logic 177 may continue to disable the flow meter 44 and terminate the current refueling operation so that no fuel is dispensed to the vehicle 31. The control logic 177 may keep the fuel meter 44 in the disabled state until a tag 200 is read that indicates a match for the type of fuel to be delivered by the truck 12.

Moreover, when a fuel type mismatch is detected and the meter 44 disabled in response, a user may take steps to remedy the problem. As an example, the user may connect the hose 49 to a different vehicle 31 having a fuel type requirement that would be a match for the fuel type to be delivered, and the user may scan the tag 200 of such vehicle 31 with the mobile device 15 in order to perform a new refueling operation on such vehicle 31. Alternatively, if there are different types of fuels in the different tanks 33, the user can control the valves 36 such that the tank 33 selected for fuel delivery matches the fuel type requirement of the vehicle 31 that is being refueled. The user may then commence a new refueling operation in which case the fuel type comparison should indicate a match such that the meter 44 is permitted to flow fuel to the vehicle 31.

Note that the system 10 may be used to monitor many aspects of refueling operations, including keeping a record of employees who are dispensing fuel for the refueling operations. In some embodiments, a given employee is charged with the task of using the fuel truck 12 to deliver fuel along a given route that may be indicated by the route data 222. Before commencing the route, the employee may log into the device 15 for enabling the control logic 177 to track the employee's work schedule. As an example, the device 15 may store employee data 225, as shown by FIG. 3, that is associated with the employee and includes various information about the employee. In this regard, the employee data 225 may include information that can be used to identify the employee such as an employee identification number or the employee's name. The employee data 225 may also include authentication information, such as a username and password or other type of authentication information (e.g., biometrics), that can be used to authenticate the employee. In some cases, an image of the employee may be captured and used for authentication. When the employee logs in, the employee may provide such authentication information (e.g., username and password) so that the control logic 177 can authenticate the employee.

The employee data 225 may also include information indicating a schedule that the employee has worked. For example, when the employee works a shift in which the employee uses a truck 12 to perform refueling operations, the employee may log in at the beginning of the shift and log out once the shift is completed. The control logic 177 may be configured to track the amount of time that elapses from log in to log out and store such time in an entry associated with the work shift so that the employee data 225 can be analyzed to determine how long the employee worked for the shift. By tracking this information overtime, a schedule of the employee's work hours over some time period, such as a week, month, year, or some other time period, can be defined in the employee data 225. In some embodiments, the employee's hours of service (HOS) is tracked and used for Department of Transportation (DOT) restriction purposes.

In some embodiments, the control logic 177 is configured to capture an image of the employee at log in for a work shift using a camera 227 (FIG. 3). The control logic 177 may be configured to store such image as part of the employee data 225 and associate the image with the work shift in the data 225. Thus, in analyzing the data 225, the image can be used to confirm that the correct employee used the mobile device 15 to perform the work shift and, thus, use the truck 12 to deliver fuel along the route for the shift. The work schedule indicated by the employee data 225 may be used by the employee's employer to ensure that the employee is appropriately compensated for the hours worked by the employee. As an example, the control logic 177 may be configured to generate a report indicative of the employee's work schedule, as indicated by the employee data 225, and provide the report to a user who may then use the report to ensure that the employee is appropriately compensated.

Note that if the employee fails to log out, such as when the employee forgets at the completion of a shift, the control logic 177 may be configured to use information tracked for the refueling operation in order to estimate when the employee's shift actually ended and update the employee data 225 accordingly. For example, the control logic 177 may use the reading of tags 200 as an indicator that the employee is still working on his or her current shift. If a predefined amount of time elapses (e.g., about two hours) since the last reading of a tag 200, the control logic 177 may determine that the employee's shift has ended without the employee logging out. In such case, the control logic 177 may use the time of the last reading of a tag 200 to estimate when the employee's shift ended.

As an example, the control logic 177 may assume that the employee's shift ended at the time of the last tag reading or a certain amount of time after the last tag reading. In some embodiments, the control logic 177 may assume that the employee's shift ended when the truck 12 reached a certain geographic region (e.g., the end of the route indicated by the route data 222) or a certain amount of time after the truck 12 reaches the region. In other examples, other techniques may be used to determine the end of the employee's shift based on tracked information when the employee forgets or otherwise fails to log out.

In some embodiments, the tracked information may also be used to facilitate fuel tax reporting. In this regard, an operator of a service for using the truck 12 to perform refueling operations and/or the clients serviced by such operator (e.g., the owners or operators of the vehicles being serviced) may be required to pay monthly, quarterly, or other types of taxes for the dispensed fuel. In defining the fuel data 210 for a refueling operation on a particular vehicle 31, the control logic 177 may associate the vehicle's identifier with the amount of fuel dispensed to the vehicle 31, as described above. The control logic 177 may also associate other information with the refueling operation.

As an example, an identifier of the client (e.g., the entity that owns or operates the vehicle 31) may be stored in the fuel data 210 and associated with the refueling operation. In this regard, the vehicle tag 200 may be configured to provide a client identifier identifying such entity when read by the reader 199 along with the vehicle identifier, and both the client identifier and vehicle identifier may be associated with the refueling operation, including the amount of fuel dispensed to the vehicle 31 during the refueling operation. In addition, the control logic 177 may also associate the geographic location of the vehicle 15 with the refueling operation. Notably, such geographic information may be determined in numerous ways, such as the location sensor 66 of the fuel truck 12, a location sensor (not shown) of the user mobile device 15, or based on the route data 222 indicating location of the stop at which the vehicle 31 is located. Thus, the fuel data 210 can be analyzed to determine, for each refueling operation, the vehicle 31 being refueled, the client associated with the vehicle 31, the location of the vehicle 31 at the time of the refueling operation, and the amount of fuel dispensed to the vehicle for the refueling operation. As noted above, other information may also be associated with the refueling operation, such as the type of fuel dispensed and the price of the fuel at the time of the refueling operation. Such information may be used for a variety of purposes, including how much taxes should be paid for the fuel that is dispensed.

As an example, an operator of the truck 12 or a client of such operator may be required to pay a certain tax based on the amount of fuel dispensed to the client's vehicles in a certain region, such as a county or state. The information in the fuel data 210 may be used to determine the total amount of fuel dispensed to the client's vehicles 31 within such geographic region over a defined time period, such as a month, quarter, or year. Based such amount, the amount of taxes owed can be quickly determined. In other embodiments, the tracked information (including the total amount of fuel dispensed to one or more vehicles 31 over time) may be used for other purposes.

In some cases, an amount of tax owed may also be based on the number of miles driven by the vehicle 31 within a certain region, such as a state. The control logic 177 can be configured to track miles driven by a vehicle 31 to assist with such a tax determination. As an example, when a vehicle 31 is being refueled, a reading of the vehicle's odometer may be performed and entered, and the control logic 177 may associate such reading with the refueling operation in the fuel data 210. The amount of miles driven between consecutive refueling operations may be calculated by subtracting the odometer's reading for the earlier refueling operation from the odometer reading for the later refueling operation. Thus, over time, the total amount of miles driven for the fuel dispensed to a given vehicle 31 can be calculated and used to determine an amount of tax that is owed or used for other purposes as may be desired.

Note that the odometer reading may be performed by a human, such as the user of the device 15, and manually input to the device 15. In some cases, the control logic 177 may be configured to prompt the user for the input and require the user to enter such input before taking certain actions, such as permitting fuel to be dispensed to the vehicle 31. As an example, the route data 222 may indicate which clients require or desire the system 10 to track mileage. When a vehicle 31 being serviced is associated with such a client, the control logic 177 may prompt the user for the odometer reading and, if desired, require the user to input the odometer reading as described above.

In addition, the analyses of the fuel truck data 205, the fuel data 210, or the employee data 225 described above may be performed by the control logic 177 of the mobile user device 177, or any of such analyses may be performed by logic residing elsewhere, such as at the server 21. As an example, it is possible for any vehicle 31 over time to be serviced by different trucks 12 such that the fuel data 210 for the vehicle's refueling operations can be accumulated by the server 21 from multiple user mobile devices 31 over time. Thus, analyzing the fuel data 210 at the server 21 or other central location may facilitate inclusion of data from multiple devices 15 into an analysis being performed. Similarly, employee data 225 and truck data 210 from multiple devices 15 may be accumulated and analyzed at the server 21 or other location.

Now, therefore, the following is claimed:

1. A system for tracking fuel deliveries, comprising:
a fuel truck having a plurality of fuel tanks and a fuel meter connected to the fuel tanks, the fuel meter having a first valve for controlling a flow of fuel from the plurality of fuel tanks; and
a user mobile device configured to communicate with the fuel meter, the user mobile device having a reader for reading a vehicle identifier of a vehicle from a tag on the vehicle, the user mobile device configured to enable the fuel meter for permitting the fuel to flow through the first valve for a refueling operation for the vehicle in response to the reading of the vehicle identifier, the user mobile device configured to poll the fuel meter for receiving from the fuel meter a plurality of readings indicating amounts of the fuel that have passed through the fuel meter, the user mobile device is configured to determine a first value indicating a total amount of the fuel that has passed through the fuel meter during the refueling operation for the vehicle based on the plurality of readings, and wherein the user mobile device is configured to store the first value in memory and correlate the first value with the vehicle.

2. The system of claim 1, wherein the user mobile device is configured to determine when the flow of the fuel through the fuel meter has stopped for at least a predefined amount of time based on the plurality of readings, the user mobile device configured to disable the fuel meter for preventing the fuel from flowing through the fuel meter in response to a determination that the flow of the fuel through the fuel meter has stopped for at least the predefined amount of time.

3. The system of claim 1, wherein the user mobile device is configured to store a second value indicating a total amount of fuel in one of the fuel tanks, and wherein the user mobile device is configured to update the second value based on the first value.

4. The system of claim 1, wherein the user mobile device is configured to determine a geographic location for the refueling operation and to correlate the first value and the vehicle identifier with data indicative of the geographic location.

5. The system of claim 1, wherein the user mobile device is configured to estimate an amount of fuel for completing refueling operations in the future along a route based on the first value.

6. The system of claim 1, wherein the reader is configured to receive from the tag information indicative of at least one fuel type requirement for the vehicle, wherein the user mobile device is configured to compare the at least one fuel type requirement to information indicative a fuel type for the fuel and to determine whether the fuel type matches the at least one fuel type requirement, and wherein the user mobile device is configured to control the fuel meter for preventing the fuel from flowing to the vehicle if the fuel type does not match the at least one fuel type requirement.

7. The system of claim 1, wherein the reader is configured to read the tag via radio frequency identification (RFID).

8. The system of claim 1, wherein the reader is configured to read the tag via near field communication (NFC).

9. A mobile device for tracking fuel deliveries, comprising:
a reader for reading information from a tag on a vehicle, including at least a vehicle identifier of the vehicle; and
at least one processor programmed with instructions that, when executed by the at least one processor, cause the at least one processor to:
communicate with a fuel meter of a fuel truck for enabling the fuel meter in response to reading of the vehicle identifier by the reader so that the fuel meter allows fuel to flow from a tank of the fuel truck through the fuel meter for a refueling operation for the vehicle;
poll the fuel meter for receiving from the fuel meter a plurality of readings indicating amounts of the fuel that have passed through the fuel meter;
determine a first value indicating a total amount of the fuel that has passed through the fuel meter during the refueling operation for the vehicle based on the plurality of readings;
store the first value in memory; and
correlate the first value with the vehicle identifier in the memory.

10. The mobile device of claim 9, wherein the instructions, when executed by the at least one processor, cause the at least one processor to:
determine when the flow of the fuel through the fuel meter has stopped for at least a predefined amount of time based on the plurality of readings; and
disable the fuel meter for preventing the fuel from flowing through the fuel meter in response to a determination that the flow of the fuel through the fuel meter has stopped for at least the predefined amount of time.

11. The mobile device of claim 9, wherein the instructions, when executed by the at least one processor, cause the at least one processor to:
store a second value indicating a total amount of fuel in the tank; and
update the second value based on the first value.

12. The mobile device of claim 9, wherein the instructions, when executed by the at least one processor, cause the at least one processor to:
determine a geographic location for the refueling operation; and
correlate the first value and the vehicle identifier with data indicative of the geographic location.

13. The mobile device of claim 9, wherein the instructions, when executed by the at least one processor, cause the at least one processor to estimate an amount of fuel for completing refueling operations in the future along a route based on the first value.

14. The mobile device of claim 9, wherein the reader is configured to read from the tag information indicative of at least one fuel type requirement for the vehicle, and wherein the instructions, when executed by the at least one processor, cause the at least one processor to:
compare the at least one fuel type requirement to information indicative a fuel type for the fuel and to determine whether the fuel type matches the at least one fuel type requirement; and
control the fuel meter for preventing the fuel from flowing to the vehicle if the fuel type does not match the at least one fuel type requirement.

15. The mobile device of claim 9, wherein the reader is configured to read the tag via radio frequency identification (RFID).

16. A method for tracking fuel deliveries, comprising:
reading, with a reader of a mobile device, information from a tag on a vehicle, including at least a vehicle identifier of the vehicle;
enabling, with the mobile device, the fuel meter in response to the reading so that the fuel meter allows fuel to flow from a tank of the fuel truck through the fuel meter for a refueling operation for the vehicle;
polling, with the mobile device, the fuel meter for receiving from the fuel meter a plurality of readings indicating amounts of the fuel that have passed through the fuel meter;
determining, with the mobile device, a first value indicating a total amount of the fuel that has passed through the fuel meter during the refueling operation for the vehicle based on the plurality of readings;
storing the first value in memory; and
correlating, in the memory, the first value with the vehicle identifier.

17. The method of claim 16, further comprising:
determining, with the mobile device, when the flow of the fuel through the fuel meter has stopped for at least a predefined amount of time based on the plurality of readings; and
disabling, with the mobile device, the fuel meter for preventing the fuel from flowing through the fuel meter in response to a determination that the flow of the fuel through the fuel meter has stopped for at least the predefined amount of time.

18. The method of claim 16, further comprising updating, with the mobile device based on the first value, a second value indicating a total amount of fuel in the tank of the fuel truck.

19. The method of claim 16, further comprising:
determining a geographic location for the refueling operation with the mobile device; and
correlating, with the mobile device, the first value and the vehicle identifier with data indicative of the geographic location.

20. The method of claim 16, further comprising estimating an amount of fuel for completing refueling operations in the future along a route based on the first value.

21. The method of claim 16, wherein the reading comprises reading from the tag information indicative of at least one fuel type requirement for the vehicle, and wherein the method further comprises:
comparing, with the mobile device, the at least one fuel type requirement to information indicative a fuel type for the fuel;
determining, with the mobile device, whether the fuel type matches the at least one fuel type requirement; and
controlling, with the mobile device, the fuel meter for preventing the fuel from flowing to the vehicle if the fuel type does not match the at least one fuel type requirement.

22. The method of claim 16, wherein the reader is configured to read the tag via radio frequency identification (RFID).

* * * * *